United States Patent
Alam et al.

(10) Patent No.: US 11,165,688 B2
(45) Date of Patent: Nov. 2, 2021

(54) REFORMATTING MESSAGE CONTENT UPON DETECTING TRANSMISSION FAILURE

(71) Applicant: SINCH GERMANY GMBH, Munich (DE)

(72) Inventors: Saud Alam, Lucknow (IN); Bhomik Pande, Bangalore (IN); Neeraj Singh, Bangalore (IN); Marut Gaonkar, Milpitas, CA (US)

(73) Assignee: SINCH GERMANY GMBH, Munich (DE)

( * ) Notice: Subject to any disclaimer, the term of this patent is extended or adjusted under 35 U.S.C. 154(b) by 0 days.

(21) Appl. No.: 16/700,535

(22) Filed: Dec. 2, 2019

(65) Prior Publication Data
US 2021/0168067 A1   Jun. 3, 2021

(51) Int. Cl.
*H04L 12/703* (2013.01)
*H04L 12/58* (2006.01)
*H04W 4/14* (2009.01)
*H04W 4/18* (2009.01)

(52) U.S. Cl.
CPC ............ *H04L 45/28* (2013.01); *H04L 51/066* (2013.01); *H04L 51/38* (2013.01); *H04W 4/14* (2013.01); *H04W 4/18* (2013.01)

(58) Field of Classification Search
CPC ....... H04L 45/28; H04L 51/066; H04L 51/38; H04W 4/14; H04W 4/18
USPC ......................................................... 709/223
See application file for complete search history.

(56) References Cited

U.S. PATENT DOCUMENTS

| | | | | |
|---|---|---|---|---|
| 4,939,726 A | * | 7/1990 | Flammer | H04L 45/00 370/400 |
| 6,104,801 A | * | 8/2000 | Miloslavsky | H04L 67/306 379/219 |
| 7,319,665 B2 | * | 1/2008 | Kim | H04L 41/0677 370/218 |
| 8,103,796 B2 | * | 1/2012 | Zimmet | H04L 51/066 709/246 |
| 8,150,428 B2 | * | 4/2012 | Kupsh | H04L 51/14 455/466 |
| 8,433,818 B2 | * | 4/2013 | Twitchell | H04L 69/22 709/238 |
| 10,652,153 B2 | * | 5/2020 | Twitchell, Jr. | H04L 67/14 |
| 2011/0119524 A1 | | 5/2011 | Zimmet et al. | |
| 2015/0058902 A1 | * | 2/2015 | Phillips | H04N 21/6125 725/93 |
| 2016/0205150 A1 | * | 7/2016 | Shaheen | H04W 92/02 370/328 |

(Continued)

OTHER PUBLICATIONS

Microsoft Computer Dictionary 114 (5th ed. 2002) (Year: 2002).*
Author unknown; International Search Report and Written Opinion of PCT/EP2020/084153; 2021-02-254; 16 pgs.

*Primary Examiner* — David P Zarka
(74) *Attorney, Agent, or Firm* — K&L Gates LLP

(57) ABSTRACT

System, method, and various embodiments for providing a network aggregation system are described herein. An embodiment operates by detecting a transmission failure resulting from transmitting a message from a first network operator to a second network operator. A first format of the message is identified. The message content is re-formatted from the first format to a second format. The reformatted message content is re-transmit in the second format to the second network operator.

14 Claims, 6 Drawing Sheets

(56) References Cited

U.S. PATENT DOCUMENTS

| | | |
|---|---|---|
| 2016/0286526 A1 | 9/2016 | Shirazi et al. |
| 2017/0364885 A1* | 12/2017 | Fan .................... H04N 21/2541 |
| 2018/0097756 A1* | 4/2018 | Lew ....................... H04L 51/30 |
| 2019/0306104 A1 | 10/2019 | Badulescu et al. |
| 2019/0379792 A1* | 12/2019 | Synal ..................... H04L 51/02 |
| 2020/0076729 A1* | 3/2020 | Twitchell, Jr. .......... H04L 12/56 |

\* cited by examiner

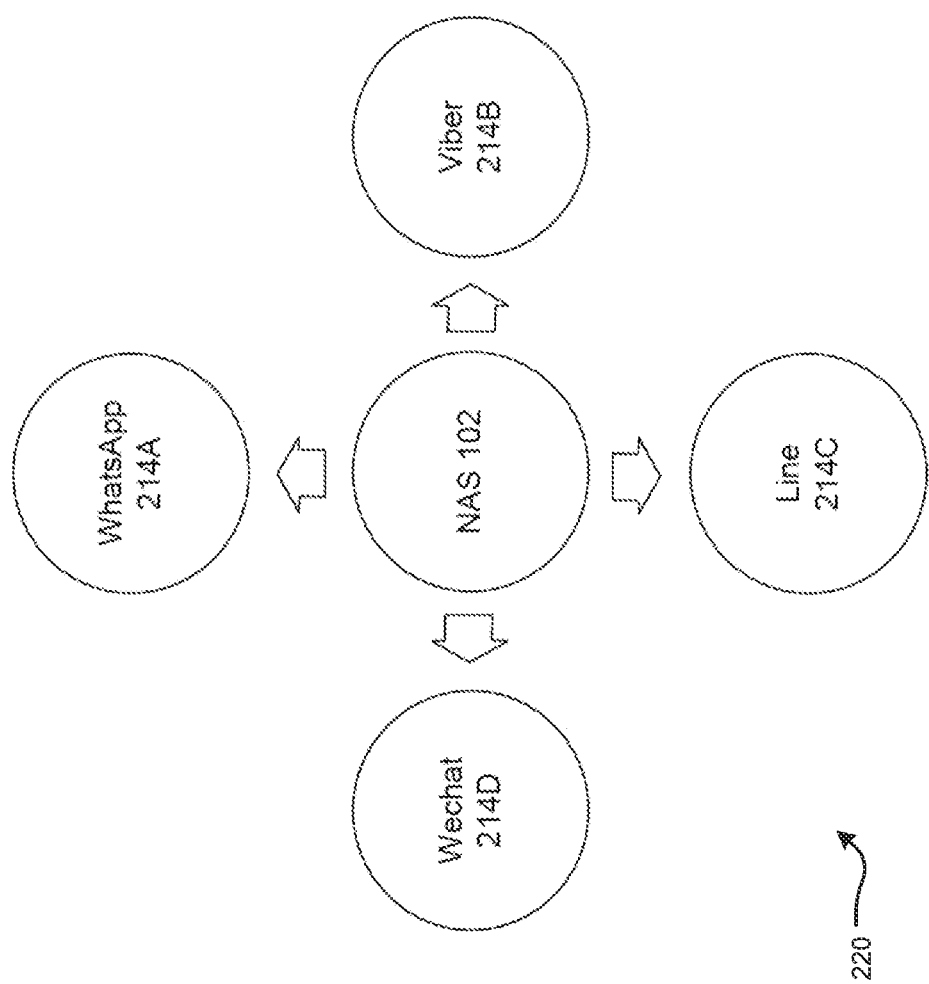

REFORMATTING MESSAGE CONTENT UPON DETECTING TRANSMISSION FAILURE

BACKGROUND

Individuals use mobile devices to communicate with each other. Mobile devices provide various different channels of communication between two or more individuals including, voice, video, text messaging, and intra-application communications, to name just a few examples. These various communication channels often transfer messages or data using various or different communications protocols.

These communication protocols may have different capabilities, such that when one communication protocol is unavailable, other communication protocols may still be available to a particular mobile device. But these communication protocols may not always work together. For example, if a user sends a text message from a first device to a second device, and the text message cannot be delivered, the delivery may be marked as failed even though other communication protocols or applications may be available to deliver messages between the devices.

BRIEF DESCRIPTION OF THE DRAWINGS

The accompanying drawings are incorporated herein and form a part of the specification.

FIG. 2C is a block diagram and data flow diagram illustrating example operations of a network aggregation system (NAS), according to some example embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a network aggregation system.

Individuals use mobile devices to communicate with each other. Mobile devices provide various different channels of communication between two or more individuals including, voice, video, text or SMS (short messaging service) messaging, and intra-application communications to name a few. These various communication channels often transfer messages or data using various or different communications protocols.

These communication protocols may have different capabilities, such that when one communication protocol is unavailable, other communication protocols may still be available to a particular mobile device. But these communication protocols may not always work together. For example, if a user sends a text message from a first device to a second device, and the text message cannot be delivered, the delivery may be marked as failed even though other communication protocols or applications may be available to deliver messages between the devices.

Figure 1:
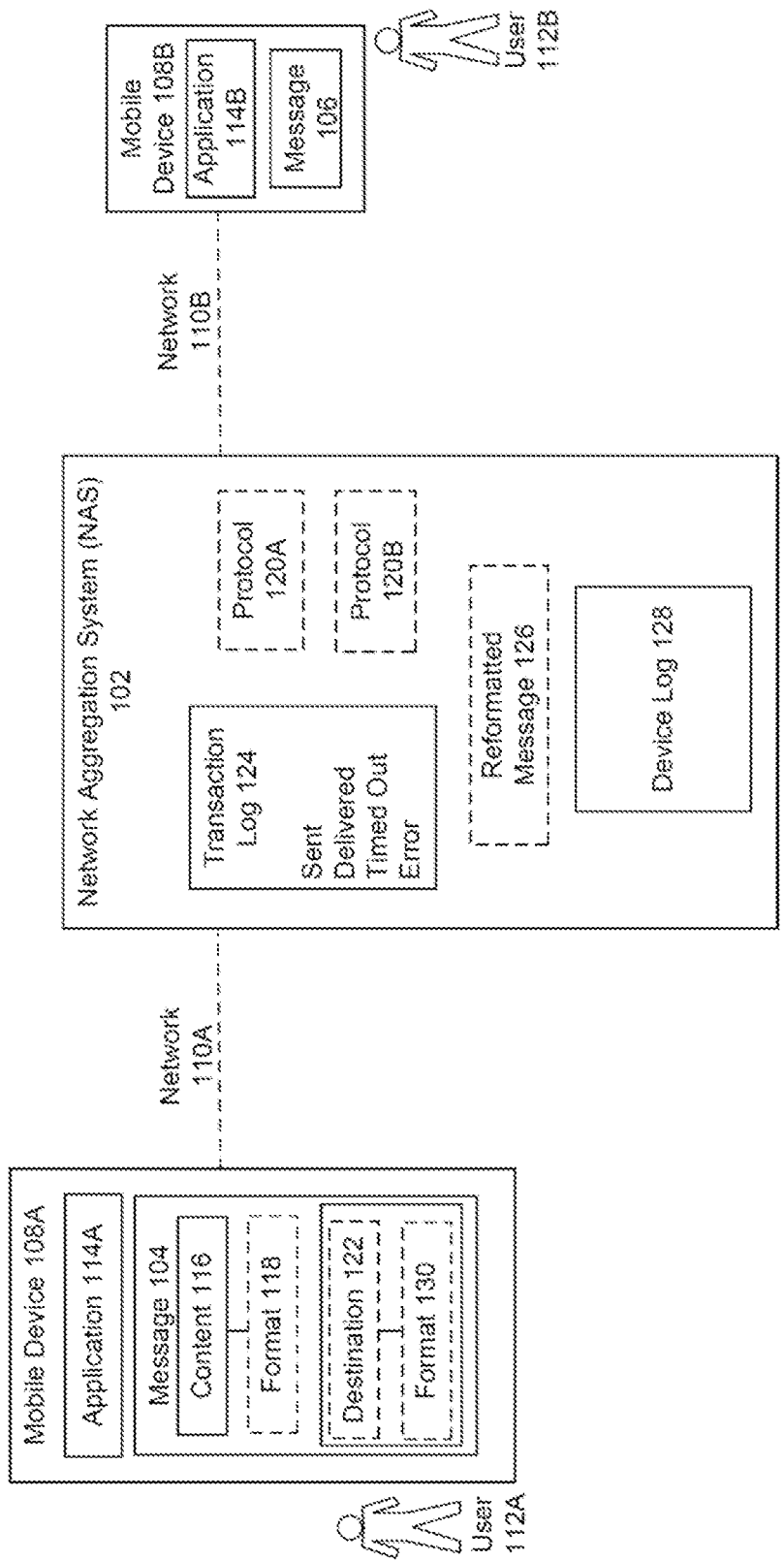
FIG. 1 is a block diagram illustrating example functionality for providing a network aggregation system (NAS), according to some embodiments.

According to embodiments of this disclosure, rather than simply accepting the failed delivery of the message as being an ultimate result, a network aggregation system (NAS) 102 may use different communication protocols and/or applications to send the contents of a message to the second device. In an embodiment, NAS 102 may continue to try different protocols and/or applications until the contents of the message have been successfully delivered or a retry threshold has been reached. FIG. 1 is a block diagram 100 illustrating example functionality for providing a network aggregation system (NAS) 102, according to some embodiments.

A first user 112A operating a first mobile device 108A may want to communicate with a second user 112B operating a second mobile device 108B. The communications may include sending a message 104 (or messages) back and forth between the devices 108A, 108B. In an embodiment, the messages 104 may be text or SMS messages or application 114 messages (including Internet enabled chat messages). Message 104 may include alphanumeric text, image files, audio files, emojis, Internet or network links, or other multimedia or documents. Message 104 may enable for synchronous or asynchronous communications between the devices 108A, 108B.

Application 114 (which may be used to generally refer to applications 114A and/or 114B) may include an app or program that enables users 112A, 112B to communicate with other users using or through the application 114. In an embodiment, both users 112A, 112B may have registered accounts with a specific application 114 and may have that application 114 installed on their mobile devices 108A, 108B to communicate with each other. Example applications 114 include, but are not limited to, WHATSAPP, FACEBOOK MESSENGER, VIBER, WECHAT, and LINE. The applications 114 may enable intra-app communications, such as messages from WHATSAPP 114A or WHATSAPP 114B, or VIBER 114A to VIBER 114B. In an embodiment, the mobile devices 108A, 108B may include multiple different applications installed and configured for communications.

In an embodiment, message 104 may either be an SMS or application 114 message. While message 104 is primarily referred to herein as an alphanumeric or text-based message (which may include images or other files), it is understood that in other embodiments, message 104 may include telephone (e.g., audio) or video communications or data packets as well, whereby applications 114A, 114B may support audio or video communications.

In an embodiment, mobile device 108A may be communicatively coupled to a first network 110A in a first geographic region, and mobile device 108B may be communicatively coupled to a different, second network 110B in the same or different geographic region. Networks 110A, 110B may include local or regional telephone or other telecommunications networks that enable the devices 108A, 108B to send and receive data, messages, and/or make phone calls or video calls.

As users 112A, 112B are moving or traveling, their mobile devices 108A, 108B may continuously (and automatically) connect and disconnect from various local networks, including but not limited to networks 110A, 110B.

Communications (including the transmission of a message 104) between the devices 108A, 108B may travel across portions of both networks 110A, 110B. And in another embodiment, additional networks (not illustrated) may participate in the transmission or data packets or message 104 as well.

Either mobile device 108A, 108B may be a mobile phone, laptop, tablet, smart television, or other smart device, TOT (Internet of Things) device, or other computing device configured with the ability to send and/or receive messages 104. Using mobile device 108A, user 112 may compose a message 104 to be sent to mobile device 108B (which may be the same or different type of device as mobile device 108A).

Message 104 may include a content portion 116. Content 116 may include alphanumeric text, images, emojis, video, audio, voice, network links, or other attached multimedia files or documents. In addition to content portion 116, message 104 may include header or other packet, routing, or transmission information, which may be part of format 118.

Message 104 may be generated, arranged, formatted, or packaged into an original or first format 118 for transmission to mobile device 108B. Format 118 may indicate or correspond to a type of message (SMS or application 114) and/or communication protocol 120 over which message 104 is being transmit (or initially transmit) from mobile device 108A over network 110A. In an embodiment, format 118 may include a source and destination of message 104.

In an embodiment, format 118 may indicate that content 116 is initially packaged in a text or SMS message (when transmit by mobile device 108A). In an embodiment, format 118 may vary based on which program, communication protocol 120A, 120B, or application 114A is being used to transmit and/or receive the message 104.

In an embodiment, text or SMS messages 104 may be transmitted over networks 110 using an SS7 (signaling system number 7) protocol. SS7 may be a telephony system signaling protocol which may be used to transmit data or messages 104 (including audio or telephone calls and text messages) over a public switched telephone network. Other examples of similar communications protocols that may be used by various networks 110A, 110B include, but are not limited to, CCSS7 (Common Channel SS7), C7, and CCIS7 (Common Channel Interoffice Signaling 7). In other embodiments, networks 110 may use any text or SMS compatible protocols when message 104 (or reformatted message 126) is an SMS or text message.

Other example communication protocols or channels which may be used to transmit message 104 between the mobile devices 108A, 108B and/or NAS 102, include but are not limited to OTT (over the top) and SMPP (short message peer-to-peer). In an embodiment, OTT may be used to send messages 104 and other data over the Internet, including providing intra or inter messaging between applications 114A, 114B. In other embodiments, networks 110 may use any data packet or application message compatible protocols when message 104 (or reformatted message 126) is an application message.

Protocol 120A may refer to a first communications protocol (corresponding to format 118) over which message 104 may be initially transmit from mobile device 108A over network 110A. Protocol 120B may refer to a second communications protocol (corresponding to format 130) over which a reformatted message 126 may be transmit from NAS 102 over a network 110B directed to mobile device 108B. Protocol 120B may include any communication channel or protocol different from protocol 120A.

In an embodiment, format 118 may include particular or specific information that is to be included in the header or packets of message 104 which may be determined based on the type of device 108A, type of message (e.g., SMS or application 114A), content 116 of the message (e.g., text, video, audio, images, etc.), and/or type of network 110A that is available to mobile device 108A. Format 118 may also include allowances or restrictions on types of content 116 that may be included with a message 104 and/or a packet or message size restrictions. In the example of FIG. 1, the original format 118 of message 104 may correspond to protocol 120A, enabling message 104 to be transmit or delivered to and/or through network 110A (to mobile device 108B and/or NAS 102).

In an embodiment, message 104 may also include or indicate a destination 122. Destination 122 may indicate to which telephone number, user account, or mobile device 108B message 104 is being transmit. In an embodiment, message 104 may include or be transmit to multiple different destinations or mobile devices 108B. In an embodiment, destination 122 may include a telephone number, IP (internet protocol) address, MAC (media access control), username or user identifier, or other identification information that enables network 110A to determine how and/or where to route message 104.

Network 110A may receive message 104 from mobile device 108A. Based on destination 122, which may be indicated in a header of a packet corresponding to message 104, network 110A may determine whether mobile device 108B (as indicated by destination 122) is accessible on the same network 110A as mobile device 108A. If mobile device 108B is connected to the same network 110A and/or same protocol 120A, then network 110A may simply deliver message 104 directly to mobile device 108B without any intervention or processing by NAS 102. In an embodiment of a network switch (e.g., from network 110A to network 110B) and/or a transmission failure of message 104 on the same network 110A between devices 108A, 108B, NAS 102 may perform message processing as described herein.

In an embodiment, mobile device 108B may need to be communicatively connected or accessible not only over the same network 110A but also accessible using the same original communication protocol 120A to avoid NAS 102 intervention. If, however, network 110A determines that mobile device 108B is not accessible on the same network 110A or communications of message 104 to mobile device 108B failed using the initial or first protocol 120A, then message 104 may be transmit to NAS 102 for forwarding across one or more other networks 110B (including one or more intervening NASs (102), which may perform their own reformatting)) until the message 104 is delivered to mobile device 108B.

NAS 102 may be an aggregator, exchange, or junction or computing devices that receive messages 104 from various networks 110A (or through initial protocols 120A) and that transmit the messages 104 to different carriers or networks 110B and/or with different protocols 120B. In an embodiment, NAS 102 may include a system of computing devices, routers, or servers of an organization that has negotiated agreements with various network operators of networks 110A, 110B, enabling cross-communication, forwarding, or transmission of data or messages 104 to and from different networks 110A, 110B using one or more different communication protocols 120A, 120B.

In an embodiment, NAS 102 may receive a message 104 transmit using a first protocol 120A or format 118 on a first network 110A, reformat the message, and re-transmit or forward the reformatted message 126 using the same network 110A but a different protocol 120B or format 130 (e.g., associated with a different application 114B than the original application 114A). In another embodiment, NAS 102 may receive message 104 transmit using the first protocol 120A or format 118 on the first network 110A, reformat the message 104, and re-transmit or forward the reformatted message 126 over a different network 110B using a different protocol 120B and/or format 130.

In an embodiment, when a network operator, subscriber, or device (of network 110A) determines that the destination 122 of a message belongs to a mobile device 108B that is connected to a different network 110B (or is otherwise inaccessible using the initial protocol 120A on network 110A), the device may transmit or forward message 104 to NAS 102 for handling or processing. NAS 102 may then forward or transmit the message 104 (as is) to the different network 110B. In an embodiment, this initial forwarding process may include some updating or adding information, such as in header or other packet information of message 104.

In an embodiment, NAS 102 may maintain a transaction log 124. Transaction log 124 may indicate a delivery status of message 104 with regard to its ultimate delivery to another user account or mobile device 108B. In an embodiment, network 110B (or network 110A) may provide status updates back to NAS 102 with regard to the delivery of message 104 to mobile device 108B (or another intervening network or NAS 102). In an embodiment, the status or updated of a forwarded message may include: sent, delivered, timed out, or error.

The "sent" status may indicate that message 104 was received by NAS 102 from network 110A and sent to network 110B for delivery to mobile device 108B. Sent may indicate that no delivery confirmation has yet been received. In an embodiment, the statuses may include indications of which protocol 120A, 120B or format 118, 130 with which message 104 was received and/or forwarded, including the number of times the message was reformatted.

The "delivered" status may indicate that message 104 was successfully transmitted to mobile device 108B. In an embodiment, delivered may indicate that a delivery confirmation has been received or detected. In an embodiment, delivered may further indicate whether the message was read, accessed, or opened by the user 112B of device 108B.

The "timed out" status may indicate that after a particular time period or number of retries, message 104 could not be confirmed as being either delivered/sent or received. The "error" status may indicate that there is a network device error or malfunction or other unknown or unresolved error that is preventing the successful transmission or delivery of message 104 to mobile device 108B.

If NAS 102 receives a "delivered" status update from network 110B, then processing of the message 104 is completed (and no further action may be required by NAS 102, other than communicating the status back to network 110A or mobile device 108A). However, if either a "timed out" status is determined by NAS 102 or received from network 110B or the "error" status is received from network 110B, NAS 102 may reformat, and re-forward or re-transmit message 104 (as reformatted message 126) using a different protocol 120B and/or format 130, relative to the original format 118 and/or protocol 120A. Or, as described above, NAS 102 may reformat a message 104 intended for a mobile device on the same network 110A, but for which initial delivery (in an original format 118 and/or protocol 120A) has failed.

If, for example, message 104 is a text message transmit over the SS7 protocol, NAS 102 may transmit the same text message 104 using the SS7 protocol over network 110B. However, network 110B may determine that the message 104 cannot be delivered to mobile device 108B using the SS7 protocol because the protocol is unavailable due to the geographic location of mobile device 108B or some other reason.

Rather than simply returning an indication to mobile device 108A that the message is undeliverable or that delivery has failed, NAS 102 may reformat the message 104 using a different protocol 120B (and/or format 130), such as OTT. NAS 102 may then transmit or forward the reformatted message 126 over network 110B using the different protocol 120B. Because while mobile device 108B may be (temporarily) unavailable to receive text messages using the SS7 protocol, mobile device 108B may still be able to receive application messages using the OTT protocol. Or, for example, NAS 102 may reformat contents 116 (as reformatting message 126) using a different application 114, from the original application 114A, but over the same protocol 120A.

The formatting or reformatting process may include extracting the content 116 of the message 104 and adding new header, footer, or packet information in accordance with what is required by a particular protocol 120B or application 114B (e.g., format 130) with at least a portion of the original content 116 (as may be allowable with the new format 130).

In an embodiment, message 104 may be a message sent from mobile device 108A using a first application 114A, such as WHATSAPP. However, mobile device 108B may not include the WHATSAPP application or the message 104 may otherwise be undeliverable to mobile device 108B. NAS 102, upon detecting a timed out or error status for message 104 (which may be received from network 110A or network 110B), may reformat the original message 104 as reformatted message 126. In an embodiment, the reformatted messages 126 may be in the form of an SMS message and may be re-transmit over network 110B to mobile device 108B.

In an embodiment, NAS 102 may reformat the original WHATAPP message format 118 into the format 130 of a FACEBOOK MESSENGER message corresponding to an application 114B that is executing on mobile device 108B, and re-send the reformatted message 126 (using the same or different communication protocol 120A). In an embodiment, NAS 102 may repeatedly reformat the message 104 into different formats 130 and/or using different protocols 120B until the content 116 of the message 104 has been successfully delivered (as indicated in log 124) or a failure threshold has been reached.

In an embodiment, NAS 102 may maintain a device log 128. Device log 128 may indicate which devices 108A, 108B are compatible with sending and receiving messages 104 using which applications 114A, 114B and/or protocols 120A, 120B. For example, NAS 102 may track which applications 114 are installed on mobile devices 108A, 108B and/or for which applications 114A, 114B users 112A, 112B have registered accounts.

In an embodiment, device log 128 may indicate over which protocols 120 particular devices 108A, 108B are compatible to send/receive message 104. Then, for example, when reformatting a failed or undelivered message, NAS 102 may verify with device log 128 whether mobile device 108B is compatible with a particular application 114A, 114B or protocol 120A, 120B prior to forwarding or transmitting the message 104 or reformatted message 126.

In an embodiment, device log 128 may include a timestamp indication of which messages 104 were failed to be delivered to mobile device 108B using different applications 114, formats 118, 130, and/or protocols 120. Then, for example, when receiving a message 104, NAS 102 may check device log 128 to determine if an earlier message was failed to be delivered using the provided format 118 and/or protocol 120A. If, an earlier error has occurred within a threshold period of time, then NAS 102 may reformat the contents 116 as described herein, and transmit or forward the reformatted message 126 using a different protocol 120B or format 130, rather than wasting resources transmitting another message that is likely to fail. For example, if a failure occurred using the SS7 protocol (120A) within the previous 3 seconds, then NAS 102 may automatically reformat any received messages 104 using the SS7 protocol directed to mobile device 108B.

In an embodiment, NAS 102 may enable user 112A to use a first application 114A for sending message 104 from mobile device 108A, and may further enable the user 112A to select through which application 114B user 112A wants user 112B to receive the content 116 of message 104. This information may be stored as destination 122.

For example, user 112A may compose a text message 104 using mobile device 108A, but may want to select by which application user 112B is to receive the content 116 of message 104. NAS 102 may enable user 112A to select the receipt of content 116 of a text message 104 as a WHATSAPP message.

In an embodiment, message 104 may then be transmit from mobile device 108A as a text message to NAS 102. NAS 102 may then reformat the content 116 from format 118 (SMS or text) into format 130 (WHATSAPP) prior to delivering reformatted message 126 over network 110B to mobile device 108B. If the delivery of the WHATSAPP message fails, then the original SMS format 118 and/or protocol 120A may be used to transmit the message over network 110B. In another embodiment, the reformatting of the text message to a WHATSAPP message may occur locally on mobile device 108A, prior to transmission to network 110A.

Figure 2A:
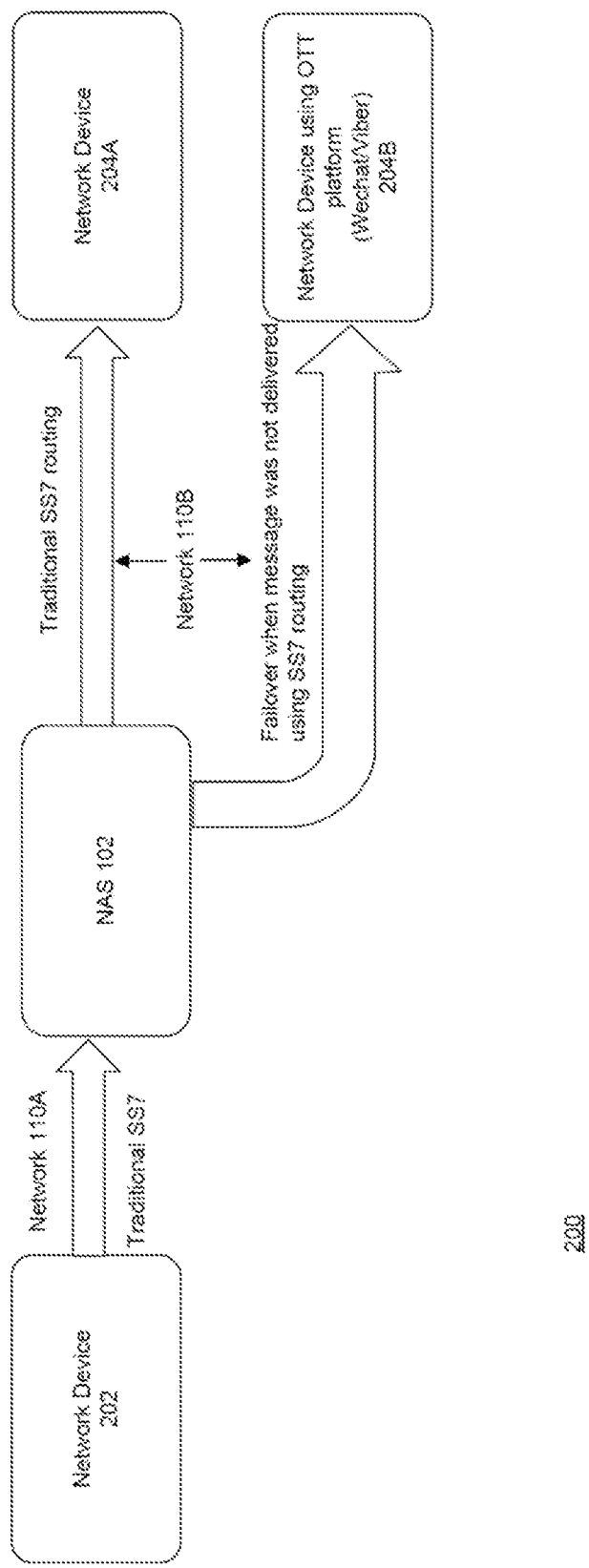
FIG. 2A is a flow chart and data flow diagram illustrating example operations of a network aggregation system (NAS), according to some example embodiments.

FIG. 2A is a flow chart and data flow diagram 200 illustrating example operations of a network aggregation system (NAS) 102, according to some example embodiments. A network device 202 operating on or communicatively coupled to network 110A may deliver a message (e.g., message 104 from FIG. 1) to NAS 102. Network devices 202, 204A, 204B may be any devices (such as servers, laptops, desktops, or routers) that are operable on networks and configured to send and/or receive messages.

A message or messages may be delivered from network device 202 (which may receive the message from a mobile device) to NAS 102 by network 110A using a traditional SS7 protocol. NAS 102 may then forward or deliver the message over network 110B using the same or traditional SS7 protocol to network device 204A. In an embodiment, the message may be sent across various different networks or network devices if the same message is being delivered to multiple, different end user devices.

As referenced above, if the delivery of the message to network device 204A and/or the delivery from network device 204A to an ultimate end user device (or another intervening network or NAS 102) fails, then a failed status may be returned to or received by NAS 102. NAS 102 may then reformat the content of the message and try delivering the reformatted message over the OTT platform to network device 204B (which may be a different or same device as network device 204A), on the same network 110B, which may then try and deliver the message to an end user or destination device. The result of the transmission (failure or success) may then be communicated back to NAS 102 and logged in a network or transaction log (e.g., transaction log 124 of FIG. 1).

Figure 2B:
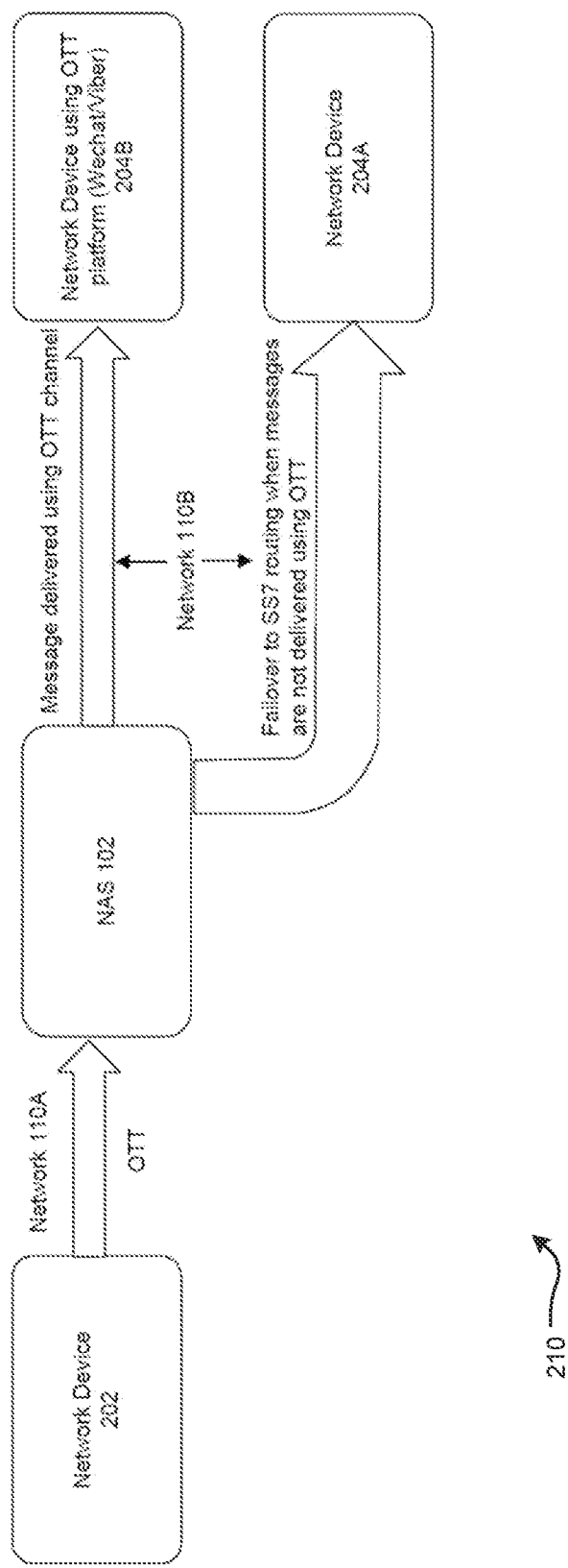
FIG. 2B is another flow chart and data flow diagram illustrating example operations of a network aggregation system (NAS), according to some example embodiments.

FIG. 2B is a flow chart and data flow diagram 210 illustrating example operations of a network aggregation system (NAS) 102, according to some example embodiments. The operations illustrated in FIG. 2B are similar to those described above with respect to FIG. 2A, except that the original message may be sent using the OTT protocol (e.g., as an application message). And upon a failure indication by network device 204B, NAS 102 may re-transmit the message over the SS7 protocol (e.g., as a text or SMS message) for ultimate delivery to an end user device.

FIG. 2C is a block diagram and data flow diagram 220 illustrating example operations of a network aggregation system (NAS) 102, according to some example embodiments. FIG. 2C illustrates that NAS 102 may provide for cross-compatibility, cross-messaging, or inter-application communications between various apps or applications 214. The illustrated applications 214 include, but are not limited to, WHATSAPP 214A, VIBER 214B, LINE 214C, and WECHAT 214D. The applications 214 may include any applications capable of sending and/or receiving intra-application alphanumeric or text messages.

In an embodiment, NAS 102 may have access to the application programming interfaces (APIs) of the various applications 214, and thus may be able to reformat the messages or content based on the source and destination applications. This may allow users to select from which application a user wants to compose or send a message, and to which application the user wants another user to receive the message (or content thereof). In an embodiment, the destination device phone number may be associated with various selectable applications. The operations illustrated in FIG. 2C may enable a user to send a Line message (214C) to another user who only has a Viber account (214B).

Figure 3:
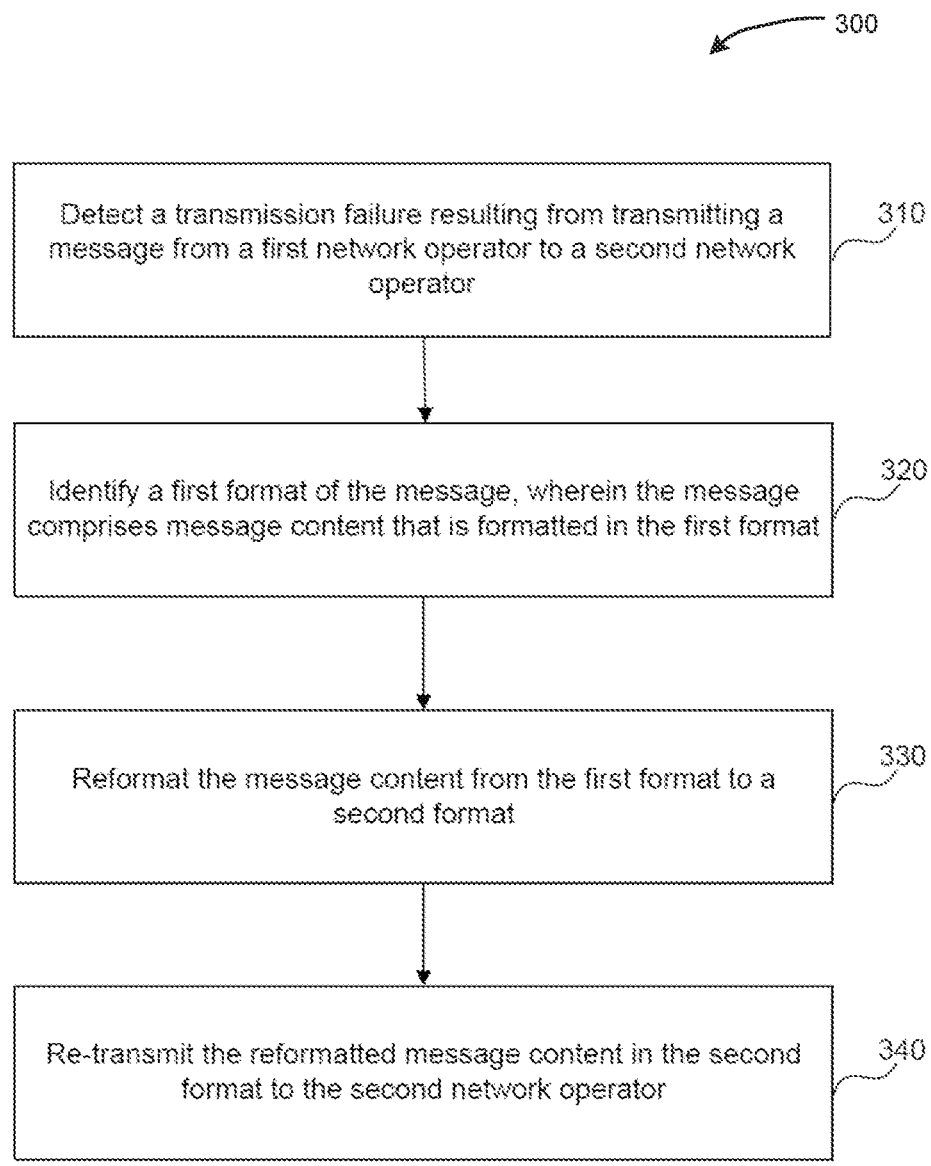
FIG. 3 is a flowchart illustrating example operations for providing a network aggregation system (NAS), according to some embodiments.

FIG. 3 is a flowchart 300 illustrating example operations for providing a network aggregation system (NAS) 102, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1. However, method 300 is not limited to the example embodiments, and may be applicable to other embodiments (such as those shown in FIGS. 2A-2C).

In 310, a transmission failure resulting from transmitting a message from a first network operator to a second network operator is detected. For example, NAS 102 may detect a transmission failure in forward or transmitting message 104 to network 110B. In an embodiment, the failure may be a "timed out" or "error" failure.

Alternatively, a user 112A may request that the content 116 of a particular message 104 be reformatted from a first format 118 into a second format 130 prior to the system detecting a failure event. In an embodiment, if a transmission failure (with content 116 in the new format 130) is detected, NAS 102 may revert to the original format 118, or try a different format as described herein.

In 320, a first format of the message is identified. For example, NAS 102 may identify a format 118 with which message 104 was initially transmitted from mobile device 108A to NAS 102, and/or from NAS 102 to network 110B. In an embodiment, format 118 may correspond to either an SMS or application based format or an SS7 or OTT protocol.

In 330, the message content from the first format is reformatted to a second format. For example, NAS 102 may reformat the content 116 of the original message 104 to fit into a second or different format 130. For example, an SS7 protocol message may be reformatted as an OTT formatted message, or vice versa.

In 340, the reformatted message content is re-transmitted in the second format to the second network operator. For example, NAS 102 may transmit or forward the reformatted message 126 to network 110B for transmission to mobile device 108B.

Figure 4:
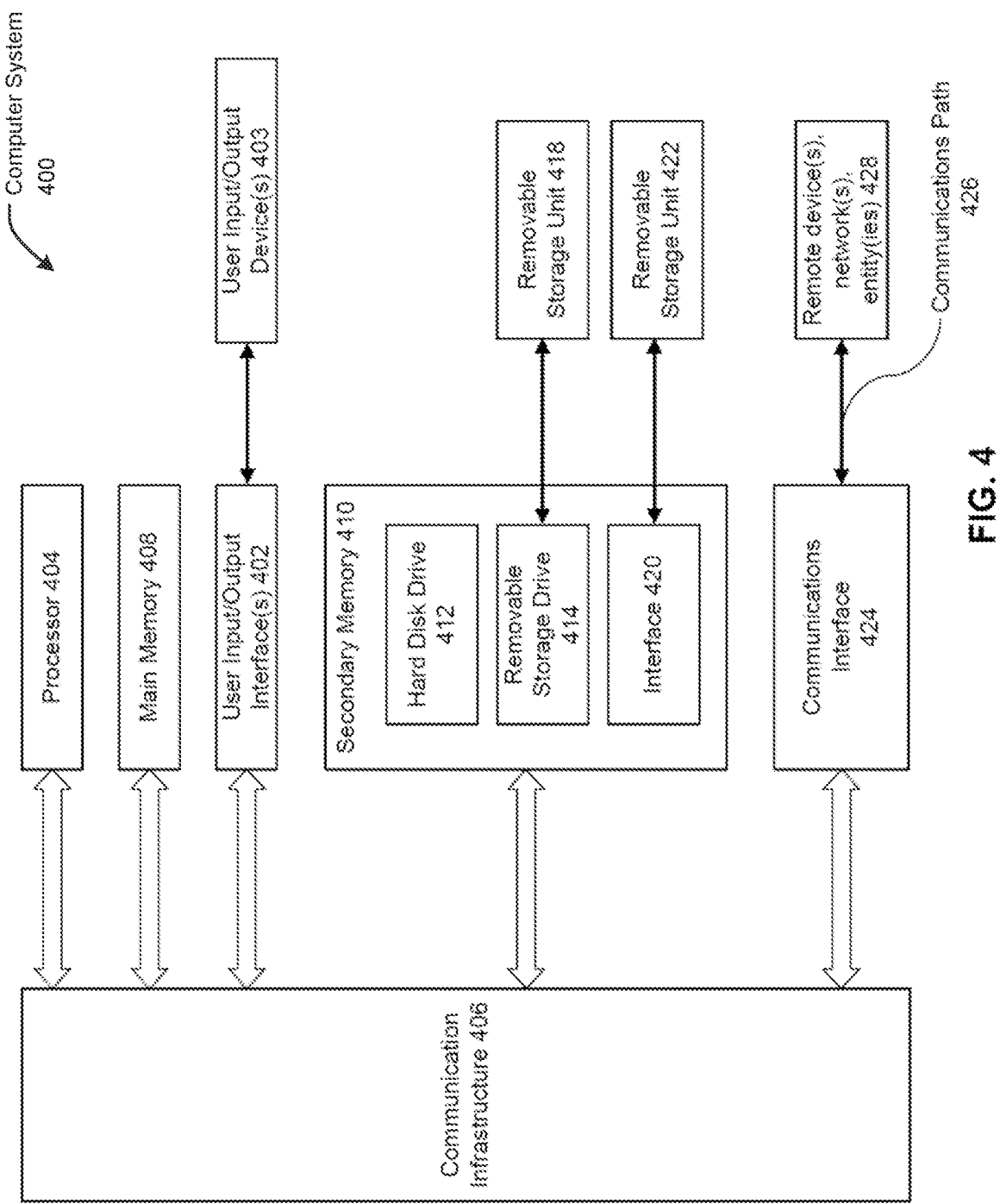
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method implemented in a network aggregation system (NAS), said method comprising:
receiving a message via a first network operator from a first mobile device, the message being destined for a second mobile device associated with a second network operator;
detecting a transmission failure resulting from transmitting the message from the first network operator to the second network operator;
identifying a first format of the message, wherein the message comprises message content that is formatted in the first format, said first format corresponding to an over the top (OTT) media service message format associated with a first messaging application operational on the first mobile device;
determining that the transmission failure resulted from transmitting the message in accordance with a first communication protocol associated with the first format;
reformatting the message content from the first format to a second format corresponding to an OTT media service message format associated with a second messaging application operational on the second mobile device;
determining that the second format is associated with a second communication protocol; and
re-transmitting the reformatted message content in the second format to the second network operator using the second communication protocol.

2. The method of claim 1, wherein the first messaging application is not operational on the second messaging application.

3. The method of claim 1, wherein the identifying comprises:
determining an identification of the second messaging application from the message.

4. The method of claim 1, further comprising maintaining a device log indicating which devices are compatible with sending and receiving messages using which applications and/or protocols, wherein said reformatting includes verifying, prior to transmitting the reformatted message content, that the second messaging application is operational on the second mobile device based on said device log.

5. The method of claim 4, wherein the device log includes a timestamp indication of which messages were failed to be delivered to a certain mobile device using different applications, formats and/or protocols.

6. The method of claim 1, further comprising accessing application programming interfaces of various applications at the first and second mobile devices, wherein said reformatting of the message content is based on applications available at the first and second mobile devices.

7. The method of claim 1, wherein the NAS is configured to receive messages from various networks and transmit messages to different carriers or networks and/or with different protocols.

8. A system comprising:
a memory; and
at least one processor coupled to the memory and configured to perform operations comprising:
receiving a message via a first network operator from a first mobile device, the message being destined for a second mobile device associated with a second network operator;
detecting a transmission failure resulting from transmitting the message from the first network operator to the second network operator;
identifying a first format of the message, wherein the message comprises message content that is formatted in the first format, said first format corresponding to an over the top (OTT) media service message format associated with a first messaging application operational on the first mobile device;

determining that the transmission failure resulted from transmitting the message in accordance with a first communication protocol associated with the first format;

reformatting the message content from the first format to a second format corresponding to an OTT media service message format associated with a second messaging application operational on the second mobile device;

determining that the second format is associated with a second communication protocol; and re-transmitting the reformatted message content in the second format to the second network operator using the second communication protocol.

9. The system of claim 8, wherein the first messaging application is not operational on the second messaging application.

10. The system of claim 8, wherein the identifying comprises:

determining an identification of the second messaging application from the message.

11. The system of claim 8, wherein the processor is further configured to maintain a device log indicating which devices are compatible with sending and receiving messages using which applications and/or protocols, wherein said reformatting includes verifying, prior to transmitting the reformatted message content, that the second messaging application is operational on the second mobile device based on said device log.

12. The system of claim 11, wherein the device log includes a timestamp indication of which messages were failed to be delivered to a certain mobile device using different applications, formats and/or protocols.

13. The system of claim 8, wherein the processor is further configured to access application programming interfaces of various applications at the first and second mobile devices, wherein said reformatting of the message content is based on applications available at the first and second mobile devices.

14. A non-transitory computer-readable device having instructions stored thereon that, when executed by at least one computing device, cause the at least one computing device to perform operations comprising:

receiving a message via a first network operator from a first mobile device, the message being destined for a second mobile device associated with a second network operator;

detecting a transmission failure resulting from transmitting the message from the first network operator to the second network operator;

identifying a first format of the message, wherein the message comprises message content that is formatted in the first format, said first format corresponding to an over the top (OTT) media service message format associated with a first messaging application operational on the first mobile device;

determining that the transmission failure resulted from transmitting the message in accordance with a first communication protocol associated with the first format;

reformatting the message content from the first format to a second format corresponding to an OTT media service message format associated with a second messaging application operational on the second mobile device;

determining that the second format is associated with a second communication protocol; and re-transmitting the reformatted message content in the second format to the second network operator using the second communication protocol.

\* \* \* \* \*